(12) United States Patent
Evers (10) Patent No.: US 8,302,468 B2
(45) Date of Patent: Nov. 6, 2012

(54) ADJUSTABLE BELT DYNAMOMETER

(75) Inventor: Joe Evers, Bozeman, MT (US)

(73) Assignee: Dynojet Research, Inc., Belgrade, MT (US)

( * ) Notice: Subject to any disclaimer, the term of this patent is extended or adjusted under 35 U.S.C. 154(b) by 387 days.

(21) Appl. No.: 12/576,620

(22) Filed: Oct. 9, 2009

(65) Prior Publication Data

US 2011/0083499 A1    Apr. 14, 2011

(51) Int. Cl.
*G01M 17/007* (2006.01)

(52) U.S. Cl. .................................................. 73/116.06

(58) Field of Classification Search ............. 73/116.05, 73/116.06, 116.07, 116.08, 116.09, 116.11, 73/123, 124

See application file for complete search history.

(56) References Cited

U.S. PATENT DOCUMENTS

| | | | | |
|---|---|---|---|---|
| 3,886,788 A * | 6/1975 | Jeter, Jr. | .................. | 73/116.11 |
| 5,844,145 A * | 12/1998 | D'Angelo | .................. | 73/862.18 |
| 5,955,662 A * | 9/1999 | D'Angelo | .................. | 73/116.06 |
| 7,409,877 B2 * | 8/2008 | Askey | .................. | 73/862.09 |
| 7,509,846 B2 * | 3/2009 | Matsumoto | .................. | 73/116.07 |
| 2005/0028584 A1 * | 2/2005 | Barnes et al. | .................. | 73/117.1 |
| 2007/0033994 A1 * | 2/2007 | D'Angelo | .................. | 73/117 |
| 2008/0047357 A1 * | 2/2008 | Askey | .................. | 73/856 |
| 2010/0251832 A1 * | 10/2010 | Kirkpatrick | .................. | 73/862.191 |

* cited by examiner

*Primary Examiner* — Eric S McCall
(74) *Attorney, Agent, or Firm* — Volpe and Koenig, P.C.

(57) ABSTRACT

An adjustable chassis dynamometer includes a fixed roller, an adjustable roller that moves with respect to the fixed roller, and at least one sensor that detects a rotational speed of the fixed or adjustable roller. A belt drive synchronizes rotation of the rollers. The belt drive includes a fixed pulley associated with the fixed roller, an adjustable pulley associated with the adjustable roller, and a tensioner pulley. A belt is provided with an inner surface and an outer surface, and surrounding the fixed, adjustable, and tensioner pulleys, such that each pulley engages the belt's inner surface. The belt drive further includes an idler pulley that moves with the adjustable pulley, is located outside of the belt, and engages the belt's outer surface.

13 Claims, 7 Drawing Sheets

ADJUSTABLE BELT DYNAMOMETER

FIELD OF INVENTION

This disclosure is directed to an adjustable belt drive. The disclosure is also directed to a chassis dynamometer having front and rear rollers, and including an adjustable belt drive for synchronizing the rollers' rotational speed, while also permitting adjustment of the longitudinal distance between the rollers to accommodate automobiles of varying wheelbases.

BACKGROUND

Dynamometers measure force or power, and are often used for diagnostic testing of machinery, such as automobiles. One type of dynamometer often used for testing of automobiles is known as a chassis dynamometer. A chassis dynamometer generally includes at least one roller or drum that supports the drive wheels of an automobile to be tested and a sensor associated with the roller. The automobile drives the roller, while the sensor detects roller properties, such as rotational speed or acceleration.

A chassis dynamometer may include multiple rollers. For example, rollers may be provided for the automobile's front and rear wheels for use with all wheel drive automobiles, in which the front and rear wheels must rotate at the same time. In such dynamometers, it may be desirable for the front and rear rollers' rotation to be synchronized, in order to test the vehicle under realistic driving conditions. It may also be desirable for such a dynamometer to permit adjustment of the distance between the front and rear rollers to accommodate automobiles having different wheelbases.

SUMMARY

The disclosure is directed to an adjustable chassis dynamometer. The dynamometer includes a fixed roller, an adjustable roller that moves with respect to the fixed roller, and at least one sensor that detects the fixed or adjustable roller's rotational speed. A belt drive synchronizes the rollers' rotation. The belt drive includes a fixed pulley associated with the fixed roller, an adjustable pulley associated with the adjustable roller, and a tensioner pulley. A belt is provided having an inner surface and an outer surface, and surrounding the fixed, adjustable, and tensioner pulleys, such that each pulley engages on the belt's inner surface. The belt drive further includes an idler pulley that moves with the adjustable pulley, is located outside of the belt, and engages on the belt's outer surface.

DETAILED DESCRIPTION OF THE DRAWINGS

Figure 1:
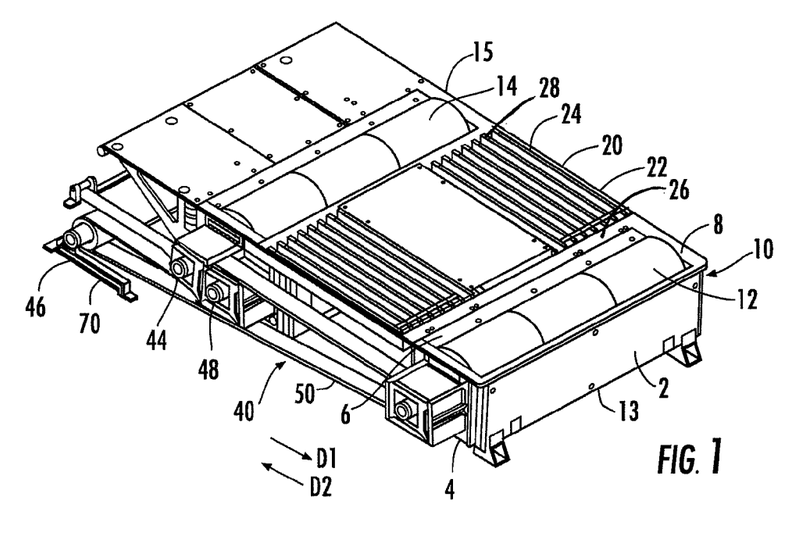
FIG. 1 is a front perspective view of an embodiment of the adjustable belt dynamometer.
Figure 2:
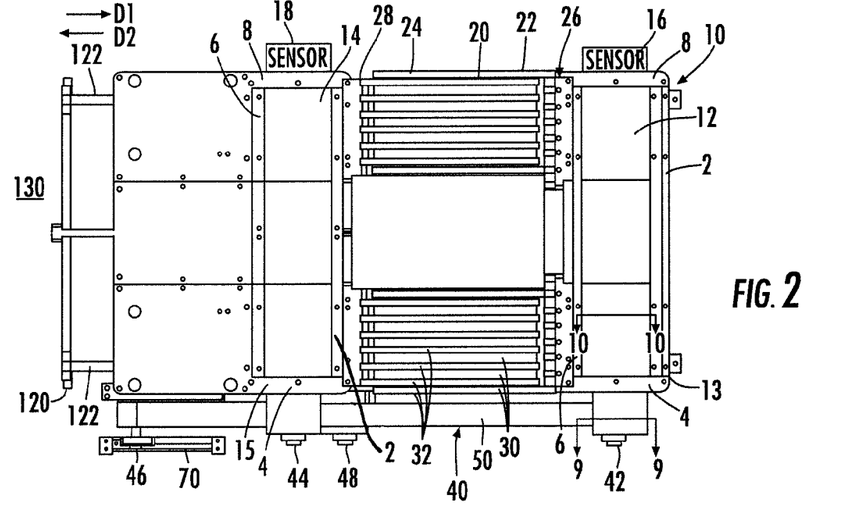
FIG. 2 is a top plan view of the dynamometer of FIG. 1.
Figure 3:
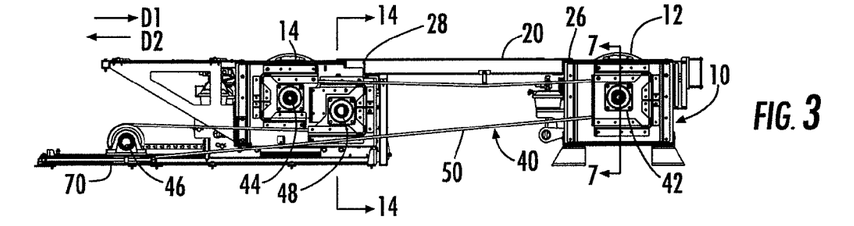
FIG. 3 is a right side elevation of the dynamometer of FIG. 1.

A chassis dynamometer 10 is shown in FIGS. 1-3. The dynamometer 10 includes a pair of rollers 12, 14 that support the front and rear wheels of an automobile. The rollers include a fixed roller 12 and an adjustable roller 14 that moves in directions D1 and D2 with respect to the fixed roller 12, to permit the dynamometer 10 to accommodate automobiles having different wheelbases.

Figure 11:
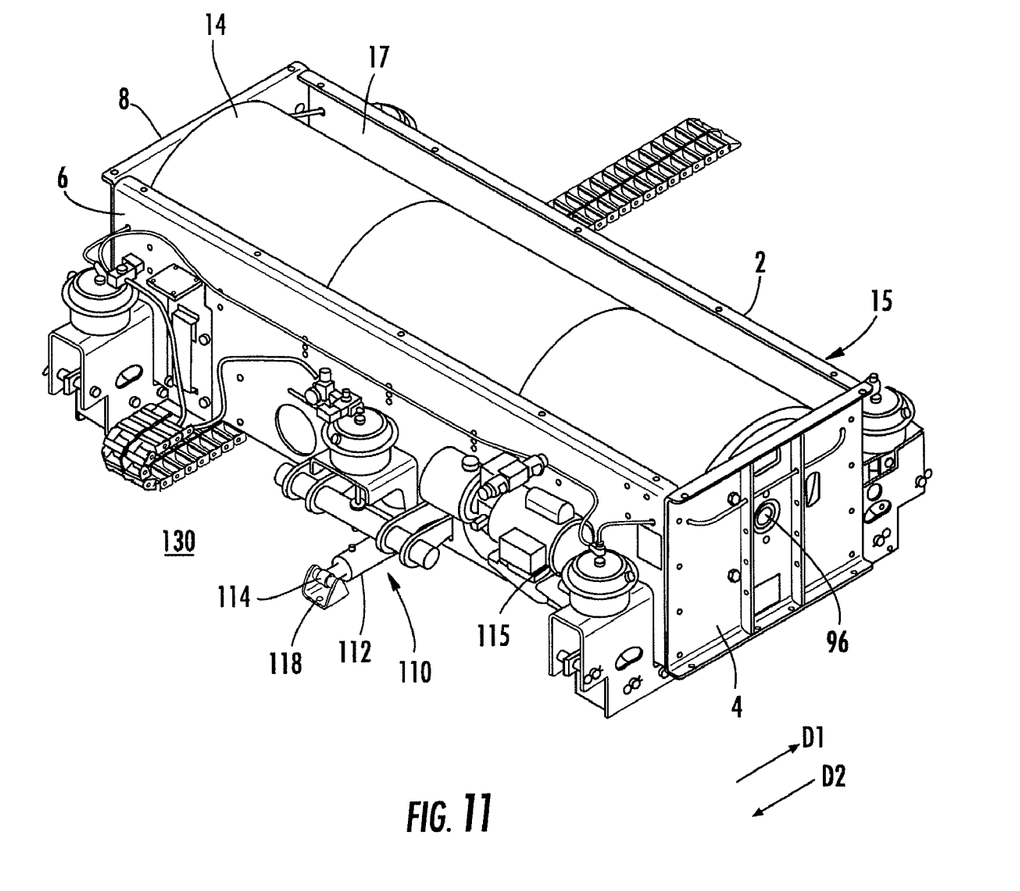
FIG. 11 shows a front perspective view of the adjustable roller's housing, showing the adjustment drive of the adjustable belt dynamometer of FIG. 1.

Each roller 12, 14 is rotatably supported within a respective housing 13, 15. FIG. 11 shows roller 14's housing 15 in detail. As shown, the housing 15 includes four side walls 2, 4, 6, 8 surrounding the adjustable roller 14, and an open top 17, exposing an uppermost portion of the adjustable roller 14 for seating an automobile's front or rear wheels thereon. The fixed roller 12's housing 13 has a similar construction including four side walls 2, 4, 6, 8.

FIG. 2 shows the dynamometer's two sensors 16, 18 that sense parameters of the rollers 12, 14 during rotation. A front sensor 16 associated with the fixed roller 12 detects the fixed roller 12's parameters during rotation, and a rear sensor 18 associated with the adjustable roller 14 detects the adjustable roller 14's parameters during rotation. Alternatively, a single sensor could detect parameters of only one of the rollers 12, 14.

An automobile is tested by parking it on the dynamometer 10 with the front wheels sitting atop one of the rollers 12, 14, and the rear wheels sitting atop the opposite roller 12, 14. The automobile is then driven over the rollers 12, 14 to rotate the rollers 12, 14, while the sensor or sensors 16, 18 measure parameters such as the rotational speed or acceleration of one or both rollers 12, 14 to determine the output of the engine.

Figure 14:
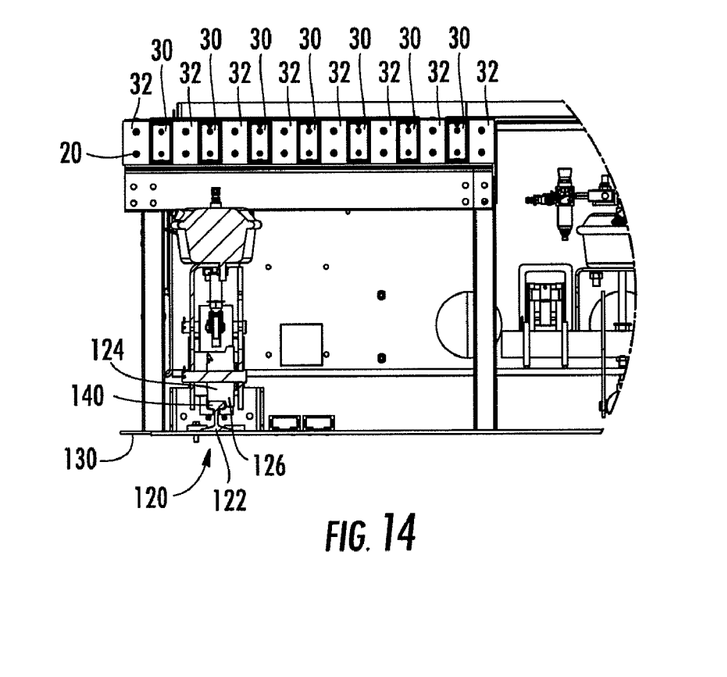
FIG. 14 shows a partial cross section taken along line 14-14 in FIG. 3.

The dynamometer 10 further includes an adjustable platform 20 that expands and contracts when the adjustable roller 14 moves. The platform 20 is located between the rollers 12, 14 with a first portion 22 having a first edge 26 located adjacent the fixed roller 12, and a second portion 24 having a second edge 28 located adjacent the adjustable roller 14. The first edge 26 is affixed to fixed roller housing 13's side wall 6 and the second edge 28 is affixed to adjustable roller housing 15's side wall 2. As best shown in FIG. 14, the first portion 22 includes a first plurality of fingers 30 extending towards the second portion 24, and the second portion includes a second plurality of fingers 32 extending towards the first portion 22. The fingers slidably interlock, for example by tongue and groove connections.

The platform 20 expands or contracts by movement of the second portion 24 in direction D1 or D2 (FIGS. 1-3) while the second plurality of fingers 32 slide with respect to the first plurality of fingers 30. The distance between the second edge 28 of the platform 20 and the adjustable roller 14 can thus remain constant during and after movement of the adjustable roller 14, to prevent formation of gaps in which the wheels of an automobile being tested could become lodged.

The dynamometer 10 includes an adjustable belt drive 40 that synchronizes the rollers 12, 14's rotational speed. The belt drive 40, shown in detail in FIGS. 4-6, includes a fixed pulley 42 coupled with the fixed roller 12, and an adjustable pulley 44 coupled with the adjustable roller 14. In the embodiment shown, the fixed pulley 42 is located at a first end 56 of the belt drive 40. An idler pulley 48 is provided adjacent the adjustable pulley 44, in a position lying between the fixed pulley 42 and the adjustable pulley 44, at a first distance from the fixed pulley 42, and the adjustable pulley 44 is located at a second distance from the fixed pulley 42, greater than the first distance. The idler pulley 48 is associated with the adjustable pulley 44, such that it moves with the adjustable pulley 44 during adjustment of the dynamometer 10. A tensioner pulley 46 is provided at a second end 58 of the belt drive 40, opposite the first end 56 having the fixed pulley 42.

The fixed pulley 42, adjustable pulley 44, and idler pulley 48 are each provided with a respective casing 43, 45, 49. The fixed pulley casing 43 is affixed to the fixed roller housing 13, while the adjustable pulley casing 45 and the idler pulley casing 49 are affixed to the adjustable roller housing 15.

Figure 5:
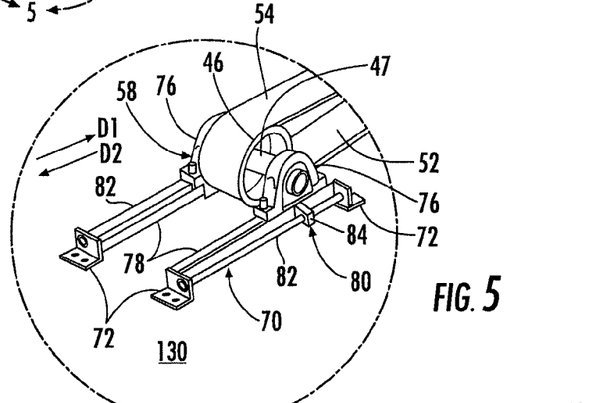
FIG. 5 shows an enlarged detail of the tensioner pulley of the belt drive of FIG. 4.

FIG. 5 shows the tensioner pulley 46 in detail. The tensioner pulley 46 moves in directions D1 and D2 along a track 70 to adjust the belt tension. The tensioner pulley 46 is rotatably mounted on an axle 47, supported by a pair of sliders 76 on opposite sides of the tensioner pulley 46. The sliders 76 have openings that slide on the track 70's pair of parallel shafts 78. The track 70 is affixed to an outside structure 130 that may not form part of the dynamometer 10. In the embodiment shown, the outside structure 130 is a surface extending beneath the dynamometer 10, such as a floor, and the track 70 is affixed to the surface 130 by brackets 72 located at opposite ends of each of the shafts 78.

The track 70 also includes a drive mechanism 80 that moves the tensioner pulley 46 along the track 70. The drive mechanism includes a pair of drive screws 82 affixed at opposite ends thereof to the brackets 72. Each drive screw 82 is mounted adjacent and parallel to a respective one of the shafts 78. A respective nut 84 is engaged with each drive screw 82 and affixed to the respective slider 76. Rotation of each drive screw 82 causes the nut 84 engaged with that drive screw 82, and thus the slider 76 and the tensioner pulley 46 mounted thereto, to move in direction D1 or D2 along the track 70, depending on the direction of rotation. Moving the pulley 46 in direction D2 adds tension to the belt 50, and while moving the pulley 46 in direction D1 reduces the tension. The belt tension is set before the dynamometer 10 is used and does not change or need to be adjusted when the adjustable roller 14 is moved.

Figure 4:
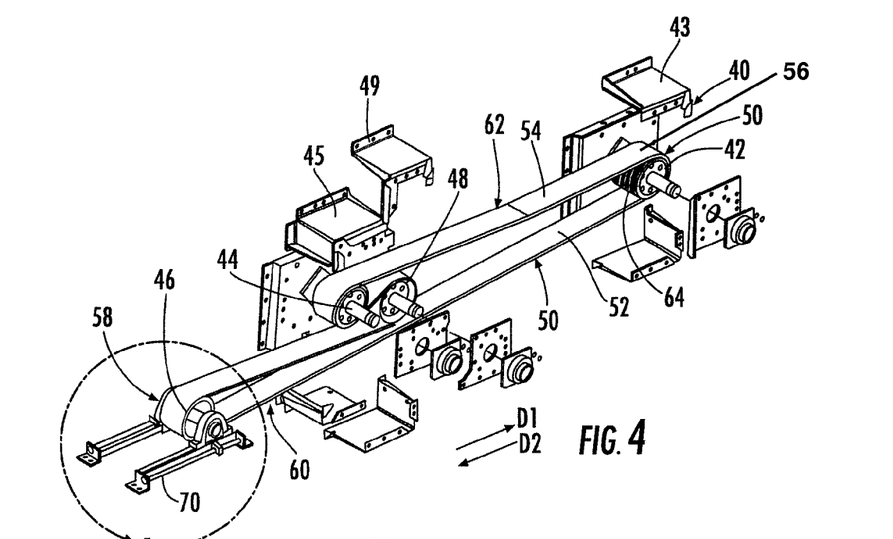
FIG. 4 is an exploded perspective view of the belt drive of the dynamometer of FIG. 1.
Figure 6:
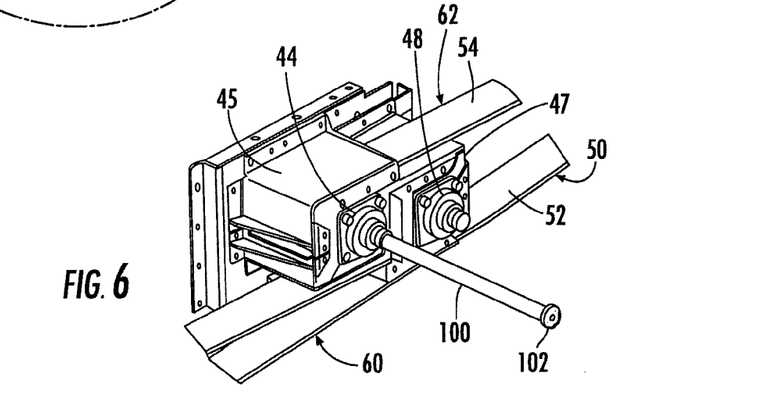
FIG. 6 shows a partially exploded view of a releasable coupling between the adjustable pulley and the adjustable roller of the dynamometer of FIG. 1.
Figure 7:
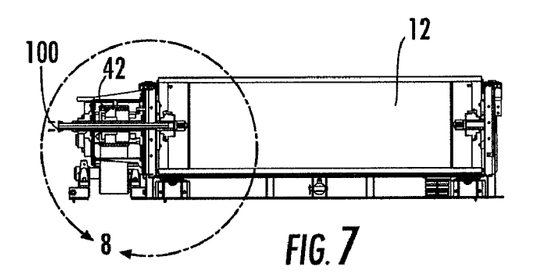
FIG. 7 is a cross section taken along line 7-7 in FIG. 3.

The belt drive 40 includes an endless belt 50, which is shown in FIGS. 4-6. The belt 50 is looped about the pulleys 42, 44, 46, 48 such that each of the fixed pulley 42, the adjustable pulley 44, and the tensioner pulley 46 lies within a loop formed by the belt 50, engaging an inner surface 52 of the belt 50, and the idler pulley 48 lies outside of the loop and engages an outer surface 54 of the belt 50.

The belt 50's path is shown in detail in FIG. 4. Following this path, a lower portion 60 of the belt 50 extends uninterrupted between the first ends 56 and second ends 58 of the belt drive 40. At the first end 56, the belt 50 loops partially around the fixed pulley 42 to form the belt 50's upper portion 62. Following the upper portion 62 in direction D2, the belt 50 extends uninterrupted between the fixed pulley 42 and the adjustable pulley 44. The belt 50 then loops partially around the adjustable pulley 44, reverses direction, and extends in direction D1 from beneath the adjustable pulley 44 and above the idler pulley 48. The belt 50 then loops partially around the idler pulley 48, again reversing direction and extending in direction D2 from beneath the idler pulley 48 to the tensioner pulley 46, looping partially around the tensioner pulley 48 and extending from beneath the tensioner pulley 46 to the fixed pulley in direction D1, again forming the belt 50's lower portion 60.

Figure 8:
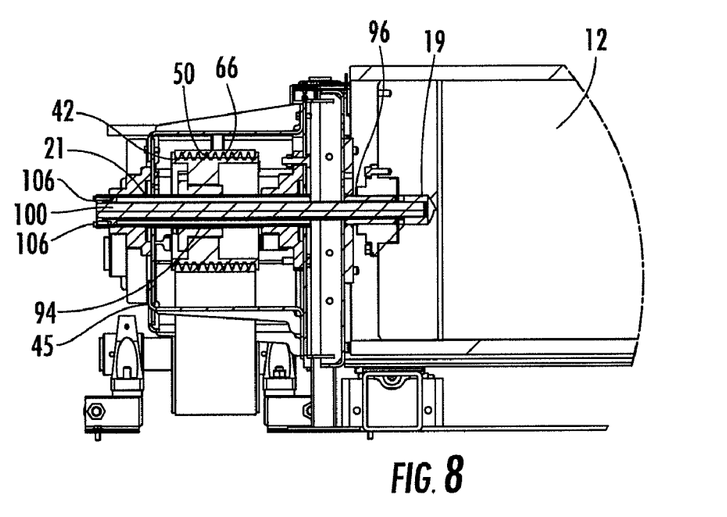
FIG. 8 is an enlarged detail of FIG. 7, showing engagement of the fixed roller and fixed roller pulley through a splined shaft.
Figure 8A:
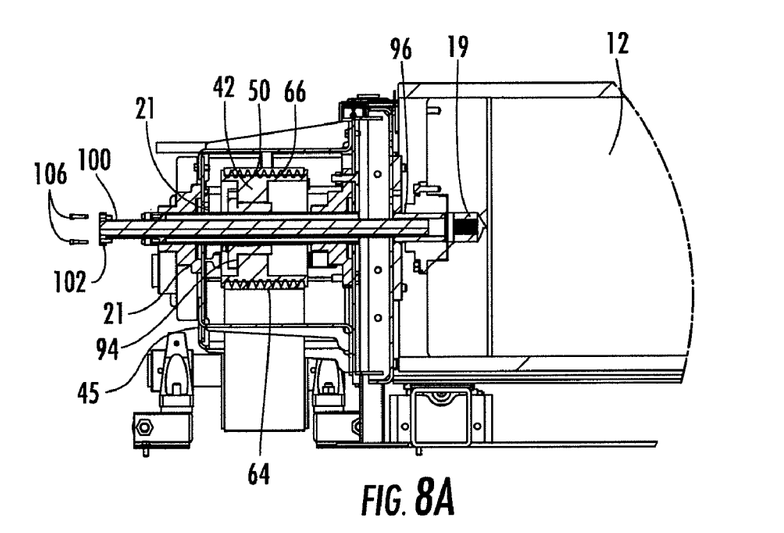
FIG. 8a shows the cross section of FIG. 8, partially exploded to show the splined shaft during disengagement from the fixed roller and fixed roller pulley.

The belt 50 may be a multi V-belt, including a plurality of V-shaped grooves 66 in the inner 52 and/or outer surface 54 thereof that engage a corresponding plurality of ridges 64 formed in one or more of the pulleys. FIGS. 8 and 8a show the V-shaped grooves 66 formed in both the inner 52 and outer surfaces 54, with those formed in the inner surface 52 engaging ridges 64 formed in the fixed pulley 42. Any or all of the pulleys can be provided with ridges 64 to increase traction between the pulley and the belt 50. The ridges 64 and/or grooves 66 may also be omitted.

The belt drive 40 synchronizes rotation of the fixed roller 12 and the adjustable roller 14, and permits movement of the adjustable roller 14 with respect to the fixed roller 12, so that the dynamometer 10 can accommodate automobiles of varying wheelbases. The fixed roller 12 and fixed pulley 42 coupled thereto remain stationary during adjustment of the dynamometer 10. The dynamometer 10 is expanded by moving the adjustable roller 14 in direction D2, away from fixed roller 12, to increase the distance between the rollers 12, 14. The adjustable pulley 44 and the idler pulley 48 are coupled with the adjustable roller 14 and move in the same direction at the same speed. The distance between the fixed pulley 42 and adjustable pulley 44 can thus be increased without breaking, expanding, or altering the tension of the belt 50.

The dynamometer 10 is contracted by reversing the actions described above. The adjustable pulley 44, idler pulley 48, and adjustable roller 14 move in direction D1, towards the fixed roller 12 and fixed pulley 42, decreasing the distance therebetween.

Figure 12:
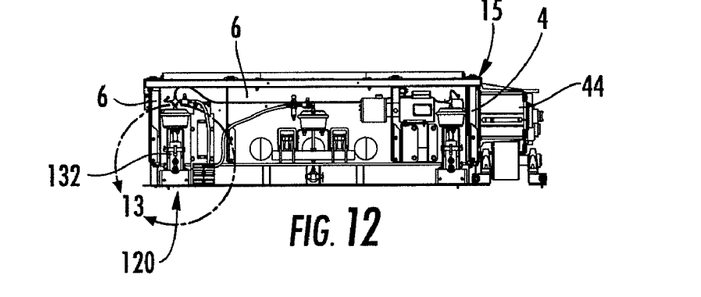
FIG. 12 is a rear elevation of the housing of FIG. 11.
Figure 13:
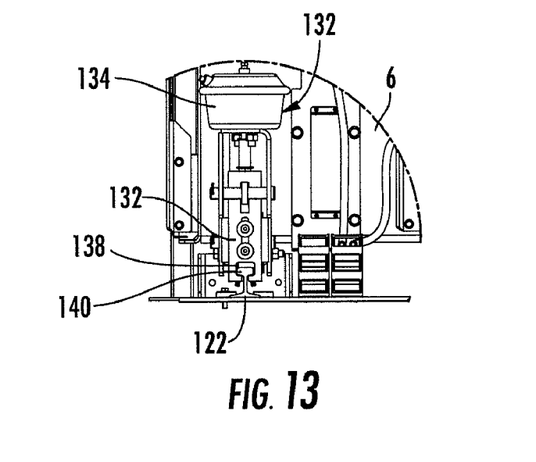
FIG. 13 shows an enlarged detail FIG. 12.

FIGS. 12-14 show a rail assembly 120 that guides the adjustable roller housing 15 during adjustment of the dynamometer 10. The rail assembly includes a plurality of rails 122. In the embodiment shown two rails 122 are provided and extend along the length of the dynamometer 10 near opposite edges thereof. FIGS. 13 and 14 show a rail 122 extending along the left side of the dynamometer 10 in detail. As shown, the rail 122 is affixed to the floor 130 and has a generally "I" shaped cross section. A plurality of flanged wheels 124 are affixed to the housing 15 for movement along the rails 122. A left side wheel 124 engaged with the left side rail 122 is shown in FIG. 14, but the right side rail would be identical thereto, and a right side wheel would be a mirror image of the left side wheel 124 shown in FIG. 14, such that the flanges 126 are disposed inwardly with respect to the rails 122. At least four wheels 124 are provided, with two being engaged with each rail 122, but more wheels 124 could be provided as well.

As shown in FIGS. 12 and 13, the rail assembly 120 further includes rail locks 132 affixed to the roller housing 15, to prevent movement of the dynamometer 10 when the adjustable roller 14 is not being adjusted. In the embodiment shown, one rail lock 132 is provided for each rail 122, but only a single rail lock 132 is required, or additional rail locks 132 could be provided. The rail lock 132 includes a groove 138 at a bottom portion thereof that extends around an upper portion 140 of a respective rail 122. An air can 134 is provided for pneumatically driving the air lock 132 downward, such that the air lock contacts and frictionally engages the rail 122. The rail lock 132 prevents longitudinal movement of the adjustable roller housing 15 by frictional engagement of the rail 122, as well as vertical movement by engagement of the groove 138 with the upper portion 140 of the rail 122.

Figure 15:
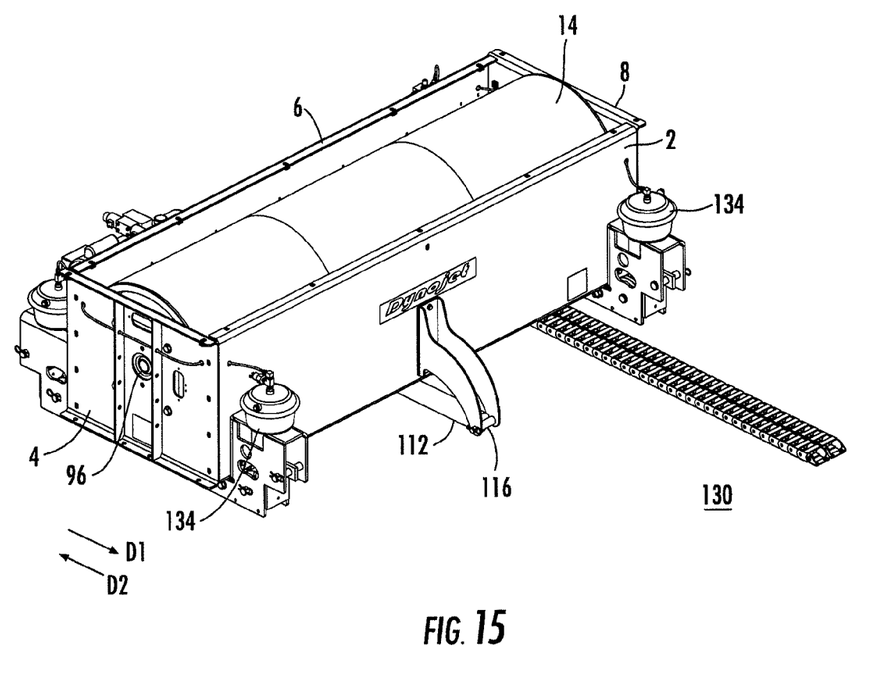
FIG. 15 shows a rear perspective view of the roller housing of FIG. 11.

FIG. 11 shows a drive assembly 110 for driving the adjustable roller 14 during adjustment of the dynamometer 10. In the embodiment shown, the drive assembly 110 includes a hydraulic pump 115 and a hydraulic ram 112 having a first end 114 affixed to an outside structure 130 by a first mounting bracket 118, and a second end 116 affixed to the adjustable roller housing 15 by a second mounting bracket 116 (FIG. 15). The outside structure 130 in the embodiment shown is the floor, but the first end 114 could be affixed to other outside structures as well. To move the adjustable roller 14, an operator actuates the drive assembly 110 using an actuation mechanism, such as a switch or button. The actuation mechanism can allow the operator to select a direction D1 or D2, in order to expand or contract the dynamometer 10. The drive assembly 110's actuation causes the hydraulic pump 115 to feed or extract fluid from the hydraulic ram 112, causing it to extend or contract. Extension of the ram 112 pushes the adjustable roller 14 and housing 15 along the track 120 in direction D1, reducing the distance between the adjustable roller 14 and fixed roller 12. Contraction of the ram 112 pulls the adjustable roller 14 and the housing 15 along the track 120 in direction D2, increasing the distance between the adjustable roller 14 and fixed roller 12.

Figure 9:
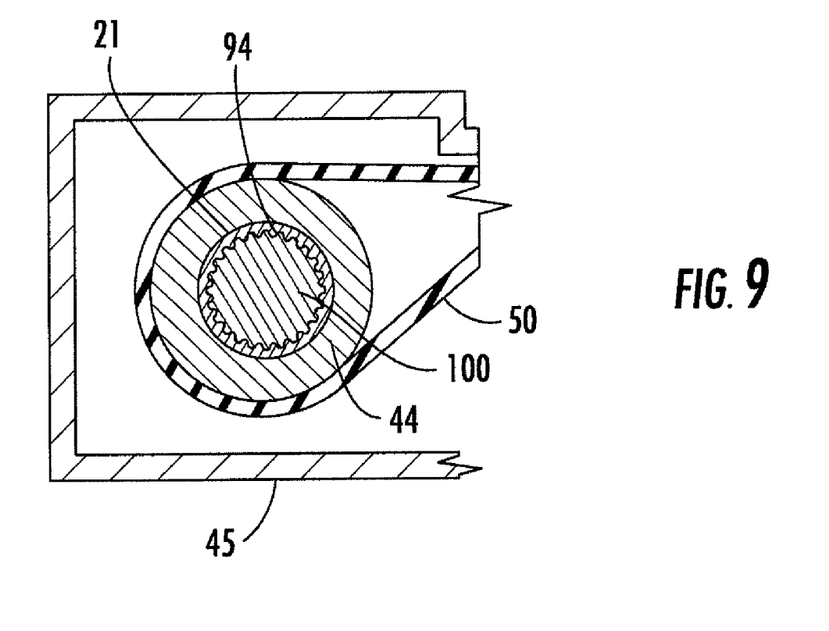
FIG. 9 is a cross section taken along line 9-9 in FIG. 2.
Figure 10:
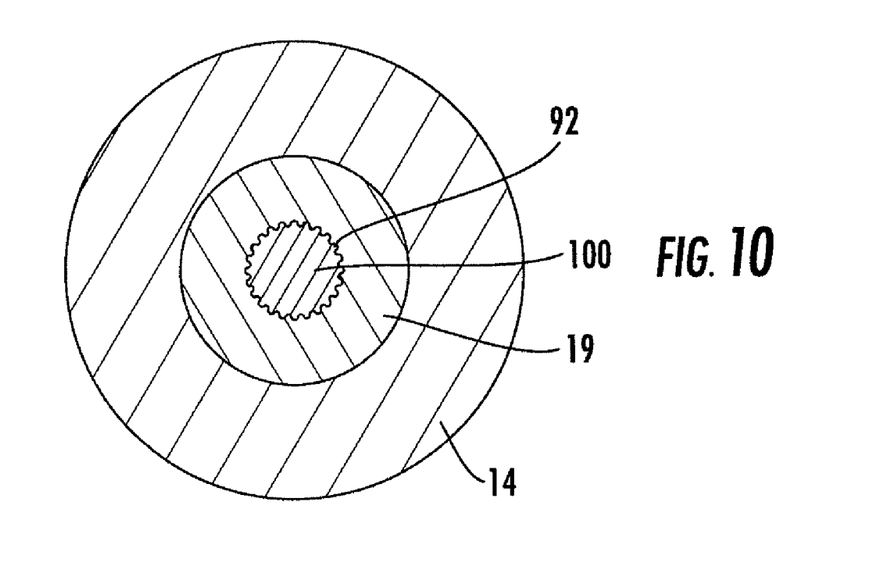
FIG. 10 is cross section taken along line 10-10 in FIG. 2.

Releasable couplings that affix each of the adjustable and fixed rollers 12, 14 with its associated pulley 42, 44 are shown in FIGS. 6-10. As shown in FIGS. 9 and 10, the fixed roller 12 and fixed pulley 42 include coaxial openings 92, 94 extending through their respective axles 19, 21. A splined shaft 100 extends through the openings 92, 94 and hole 96 formed in the roller housing 13, and engages matching splines formed in the openings 92, 94 of the fixed roller 12 and fixed pulley 42, to couple and rotationally synchronize the two. In an alternative embodiment, the shaft 100 could engage the axles 19, 21 by a series of tapered pins. The shaft 100 includes an enlarged head 102 positioned outside of the adjustable pulley casing 45 and mounted to the adjustable pulley axle 21 by, for example, a plurality of fasteners 106, such as pins and/or bolts. Removal of the fasteners 106, as shown in FIG. 8a, permits the shaft 100 to be moved in an outward axial direction for removal from the adjustable roller 14 and pulley 44. The adjustable roller 14 and adjustable pulley 44 may include a similar releasable coupling, as shown in FIG. 6. The fixed and adjustable rollers 12, 44 may be decoupled from their respective pulleys 42, 44 by removal of the splined shaft 100 where synchronization is not desired.

Although the belt is described for use in a chassis dynamometer, it can also be implemented in other devices where rotational synchronization of members thereof is desired. Although features and elements are described above in particular combinations, each feature or element can be used alone without the other features and elements or in various combinations with or without other features and elements.

What is claimed is:

1. An adjustable chassis dynamometer comprising:
   a fixed roller;
   an adjustable roller that moves with respect to the fixed roller;
   at least one sensor that detects a rotational speed of the fixed roller or the adjustable roller; and
   a belt drive that synchronizes rotation between the adjustable roller and the fixed roller, the belt drive comprising:
   a fixed pulley associated with the fixed roller;
   an adjustable pulley associated with the adjustable roller;
   a tensioner pulley;
   a belt having an inner surface and an outer surface, and surrounding the fixed pulley, the adjustable pulley, and the tensioner pulley, such that each of the fixed pulley, the adjustable pulley, and the tensioner pulley engaging the inner surface of the belt; and
   an idler pulley that moves with the adjustable pulley, is located outside of the belt, and engages the outer surface of the belt; and
   a platform that extends between the fixed roller and the adjustable roller and expands or contracts when the adjustable roller moves with respect to the fixed roller.

2. The dynamometer of claim 1, wherein the belt comprises a plurality of grooves formed in at least one of the inner surface or the outer surface, and at least one of the fixed pulley, the adjustable pulley, the tensioner pulley, or the idler pulley includes a plurality of ridges that engage the grooves.

3. The dynamometer of claim 1, wherein the tensioner pulley moves on at least one track affixed to an outside structure.

4. The dynamometer of claim 3, wherein the outside structure is a surface that extends beneath the dynamometer.

5. The dynamometer of claim 3, wherein the at least one track comprises a drive screw, the tensioner pulley is affixed to a nut that engages the drive screw, and rotation of the drive screw moves the tensioner pulley along the at least one track.

6. The dynamometer of claim 1, further comprising at least one releasable coupling between the fixed pulley and the fixed roller, or the adjustable pulley and the adjustable roller.

7. The dynamometer of claim 6, wherein the at least one releasable coupling comprises respective coaxial splined openings formed in the fixed pulley and the fixed roller, or the adjustable pulley and the adjustable roller, and a splined shaft inserted in the coaxial splined openings.

8. The dynamometer of claim 1, further comprising a drive assembly that moves the adjustable roller with respect to the fixed roller.

9. The dynamometer of claim 8, wherein the drive assembly comprises a hydraulic ram having a first end affixed to the adjustable roller and a second end affixed to an outside structure.

10. The dynamometer of claim 9, wherein the outside structure is a surface that extends beneath the dynamometer.

11. The dynamometer of claim 1, further comprising a track and a housing that houses the adjustable roller and slides along the track when the adjustable roller moves with respect to the fixed roller.

12. A method of adjusting a chassis dynamometer, comprising:
   providing the chassis dynamometer, comprising:
   a fixed roller;
   an adjustable roller that moves with respect to the fixed roller;
   at least one sensor that detects a rotational speed of the fixed roller or the adjustable roller; and
   a belt drive that synchronizes rotation between the adjustable roller and the fixed roller, the belt drive comprising a fixed pulley associated with the fixed roller, an adjustable pulley associated with the adjustable roller, a tensioner pulley, and a belt having an inner surface and an outer surface, the belt surrounding the fixed pulley, the adjustable pulley, and the tensioner pulley, such that each of the fixed pulley, the adjustable pulley, and the tensioner pulley engages the inner surface of the belt; and an idler pulley that moves with the adjustable pulley, is located outside of the belt, and engages the outer surface of the belt; and expanding the chassis dynamometer by moving the adjustable roller and the adjustable pulley in a first direction away from the fixed roller and the fixed pulley.

13. The method of claim 12, further comprising contracting the chassis dynamometer by moving the adjustable roller and the adjustable pulley in the second direction.

* * * * *